United States Patent [19]

Gray et al.

[11] Patent Number: 5,572,024

[45] Date of Patent: Nov. 5, 1996

[54] APPARATUS AND METHOD FOR ISOTOPIC RATIO PLASMA MASS SPECTROMETRY

[75] Inventors: Alan L. Gray, Farnham; Martin Liezers, Winsford; John G. Williams, Brookwood Woking, all of England

[73] Assignee: Fisons plc, Ipswich, England

[21] Appl. No.: 522,597

[22] Filed: Sep. 1, 1995

[30] Foreign Application Priority Data

Sep. 2, 1994 [GB] United Kingdom ............... 9417700

[51] Int. Cl.$^6$ .................................................. H01J 49/12
[52] U.S. Cl. ............................... 250/288; 250/281
[58] Field of Search ....................... 250/288, 281

[56] References Cited

U.S. PATENT DOCUMENTS

| | | | |
|---|---|---|---|
| 4,963,735 | 10/1990 | Okamoto et al. | 250/288 |
| 5,051,584 | 9/1991 | Gray et al. | 250/288 |
| 5,148,021 | 9/1992 | Okamoto et al. | 250/288 |
| 5,218,204 | 6/1993 | Houk et al. | 250/288 |
| 5,352,893 | 10/1994 | Freedman | 250/289 |

FOREIGN PATENT DOCUMENTS 4107794  9/1991  Germany .

*Primary Examiner*—Jack I. Berman
*Attorney, Agent, or Firm*—Chilton, Alix & Van Kirk

[57] ABSTRACT

The invention comprises a method and apparatus for inductively-coupled plasma mass spectrometry which is particularly suitable for the determination of isotopic ratios.

In order to improve the precision of such determinations, the nozzle-skimmer type interface of the mass spectrometer is arranged so that the ratio $$\frac{d_s}{s} \times \sqrt{p_1}$$

is greater than 0.8 mB$^{1/2}$, where $d_s$ is the diameter of the orifice in the skimming member, s is the spacing between the sampling member and the skiming member, and $p_1$ is the pressure in the region between the sampling and skimming members. Although use of the invention slightly reduces the efficiency of the interface it results in more accurate isotopic ratio determinations.

24 Claims, 2 Drawing Sheets

APPARATUS AND METHOD FOR ISOTOPIC RATIO PLASMA MASS SPECTROMETRY

This invention relates to apparatus and methods for the measurement of the isotopic composition of a sample by plasma mass spectrometry. In particular it relates to an improved interface between the plasma and the mass spectrometer and the operating conditions of that interface, which are such that the isotopic composition of a sample can be determined with greater precision than was possible with the prior apparatus and methods.

Inductively-coupled plasma and microwave induced plasma mass spectrometers are well known in the art and are especially suitable for the determination of the elemental composition of a sample. In view of the cost and difficulty of use of thermal ionization isotopic-ratio mass spectrometers many attempts have been made to use the cheaper and more convenient techniques of inductively-coupled plasma mass spectrometry (ICPMS) or microwave induced plasma mass spectrometry (MIPMS) for isotopic ratio analysis. Date and Gray (Spectrochim. Acta B, 1983 vol 38B pp 29–37 and Int. J. Mass Spectrom and Ion Phys, 1983 vol 48 pp 357–360) first suggested the technique, and since then there has been a steady stream of reported applications (eg, Kettener, Peters, Tisdale, J. Anal. Atom. Spectrom. 1991 vol 6 pp 439–443; Price Russ III in Ch. 4 of Applications of Inductively Coupled Plasma Mass Spectrometry, Date and Gray, Pub. Blackie, 1989 pp 90–114; Janghorbani and Ting, ibid. Ch 5 pp 115–140; Gregoire, Prog. Analyt. Spectrom. 1989 vol 12 pp 433–452; and Park, Pak, Lee, Anal. Sci. 1992 vol 8 pp 443–448.

Unfortunately, however, the precision of isotopic-ratio measurements made by ICPMS or MIPMS does not approach that routinely obtained by thermal ionization mass spectroscopy, being typically no better than about 0.1% RSD, even for equally abundant isotopes. This relatively poor performance has been attributed to the relatively poor stability of the ICP or MIP sources and also to the method of sample introduction. See, for example, Crain, Houk and Eckels, Anal. Chem. 1989 vol 61 pp 606–612 and Ince, Williams and Gray, J. Anal. Atomic Spectrom. 1993 vol 8 pp 589–.

Another source of random noise in ICPMS, reported recently by Hobbs and Olesik in Anal. Chem. 1992 vol 64 pp 274–283, is thought to be due to the inhomogeneous spatial distribution of analyte ions in the central channel of the plasma. This channel carries the sample aerosol and residual solvent in both vapour and droplet form, the latter resulting in the formation of "holes" in the ion distribution. Unfortunately, this inhomogeneous distribution is preserved on passage through a conventional ICPMS nozzle-skimmer interface because the ions are sampled from a zone of silence where there exists a continuum supersonic flow, rather than a turbulent flow. This form of noise has been termed "ion distribution noise" by the inventors.

It has been found that some of the noise sources can be reduced or even eliminated by means of an ICP torch which has a sheathing bonnet at the end (eg, Ince, Williams and Gray, J. Anal. Atomic. Spectrom 1993 vol 18 pp 899) and the use of a self-aspirating nebulizer, so that the remaining noise, (chiefly 1/f (flicker) noise and white noise) falls below the level of the statistical noise of the signals forming the spectra. However, despite this, the precision of ICPMS isotopic ratio measurements is still lower than expected from a consideration of the number of ions detected.

It is an object of the present invention, therefore, to provide a method of isotopic ratio analysis by inductively-coupled or microwave-induced plasma mass spectrometry which has greater precision than prior methods. It is a further object to provide an inductively-coupled or microwave induced plasma mass spectrometer which is particularly suitable for the determination of isotopic ratios and which has a higher precision than previously known mass spectrometers of the same general kind.

In accordance with these objectives the invention provides a method of isotopic analysis of a sample by mass spectrometry comprising the steps of:

a) introducing a said sample into the plasma generated by an inductively-coupled plasma or microwave-induced plasma mass spectrometer;

b) sampling said plasma through an orifice in a sampling member into an evacuated expansion region so that a zone of silence bounded by a barrel shock and a Mach disk is formed downstream of the orifice in said sampling member;

c) allowing at least some ions from said zone of silence through an orifice in a skimming member into a second evacuated region maintained at a pressure lower than that of said expansion region;

d) mass analyzing at least some of the ions entering said second evacuated region, said method being characterized by: maintaining the ratio $$\frac{d_s}{s} \times \sqrt{p_1}$$

at a value greater than 0.8 mB$^{1/2}$, where $d_s$ is the diameter of the orifice in said skimming member (mm), s is the distance between the exit side of the orifice in said sampling member and the entrance side of the orifice in said skimming member (mm), and $p_1$ is the pressure (mB) at which said expansion region is maintained.

Viewed from another aspect the invention provides a mass spectrometer comprising:

a) an inductively-coupled plasma or microwave-induced plasma source;

b) a sampling member disposed in contact with the plasma generated by said source and comprising an orifice;

c) an expansion region into which material passing through the orifice in said sampling member may pass;

d) means for maintaining the pressure in said expansion region at a value low enough to permit the formation of a zone of silence bounded by a barrel shock and a Mach disk downstream of the orifice in said sampling member;

e) a skimming member comprising an orifice disposed so that material may pass from said zone of silence into a second evacuated region;

f) means for maintaining said second evacuated region at a pressure lower than that in said expansion region; and g) a mass analyser disposed downstream of said orifice in said skimming member for mass analysing at least some of the ions passing into said second evacuated region through the orifice in said skimming member; wherein the ratio $$\frac{d_s}{s} \times \sqrt{p_1}$$

is maintained at a value greater than 0.8 mB$^{1/2}$, where $d_s$ is the diameter (mm) of the orifice in said skimming member, s is the distance between the exit side of the orifice in said sampling member and the entrance side of the orifice in said skimming member (mm), and $p_1$ is the pressure (mB) at which said expansion region is maintained.

The inventors have found that the precision of isotopic ratio measurements in particular can be improved significantly if the nozzle-skimmer interface of a conventional ICPMS or MIPMS is constructed and operated according to the formula given above. In prior ICPMS systems, the value of the ratio $$\frac{d_s}{s} \times \sqrt{p_1},$$

referred to hereinafter as the enhancement factor F, is typically between 0.3 and 0.7 mB$^{1/2}$. For example, a skimmer orifice diameter ($d_s$) of about 1.0 mm, sampling cone-skimmer cone separation of 7 mm, and a working expansion region pressure of about 3 mB are typical, corresponding to $$F = \frac{1.0}{7.0} \times \sqrt{3} = 0.25 \text{ mB}^{1/2}.$$

Although operation with the enhancement factor F greater than 0.80 mB$^{1/2}$ does not result in optimum transmission efficiency for the nozzle-skimmer interface, the inventors have found that the precision of the isotope-ratio measurements that are typically obtained is generally much closer to the theoretical value expected on the basis of the number of ions available for analysis. It is believed that this is due to the reduction of the ion distribution noise, discussed above, which reduction results from the greater proportion of the material in the region of supersonic continuum flow (zone of silence) which is sampled through the skimmer orifice in apparatus and methods according to the invention.

According to the invention the pressure in the expansion region, the spacing of the skimming member from the sampling member, and/or the diameter of the orifice in the skimmer member, are adjusted so that the ratio of the diameter of the barrel shock (which surrounds the zone of silence) in front of the tip of the skimming member to the diameter of the orifice in the skimming member is significantly smaller than in prior instruments. This results in a much greater proportion of the ions which enter the expansion region passing through the skimmer orifice and reduces the effect of the inhomogeneous spatial distribution of ions in the central channel of the ICP, which, as explained, is thought to be preserved in the zone of silence inside the barrel shock. Preferably this is done by increasing the pressure in the expansion stage from the typical prior range of 1–5 mB to the preferred range of the present invention of 10–30 mB.

This reduces the maximum diameter of the barrel shock from about 10 mm (characteristic of prior systems) to 2–3 mm, so that a 1 mm diameter skimmer orifice intercepts a much greater proportion of the flow which is passing into the expansion stage. However, it also has the effect of locating the Mach disk closer to the sampling orifice than it is in prior systems, which necessitates locating the skimming member closer to the sampling member (typically at a spacing of 2–3 mm rather than at about 7 mm which is typical of prior systems) to ensure that the sampling takes place from the zone of silence, as taught by the established theory of this type of interface.

In view of this requirement it is therefore convenient to define the scope of the invention in terms of the spacing between the orifices in the sampling and skimmer members, rather than the diameter of the barrel shock in the plane at which it is sampled, because that diameter cannot easily be measured. It will be understood that because the diameter of the barrel shock reduces with increasing pressure the Mach disk moves closer to the sampling member and it is necessary to reduce the skimmer-sampling member separation to maintain the design rule characteristically applied to prior interfaces, namely that the separation distance should be approximately ⅔ of the distance to the Mach disk. Consequently, the separation between the sampling and skimmer members may be taken as a practical measure of the diameter of the barrel shock at the skimmer in any practical interface where the ions are sampled from the zone of silence.

As explained, the reduction in the diameter of the barrel shock at the skimmer orifice may be achieved by increasing the pressure in the expansion stage to between 10–30 mB. This increases the flow of gas into the second evacuated region (which typically contains the mass analyzer) and may necessitate the provision of larger pumps than conventionally fitted in order to maintain the pressure in that region sufficiently low for the correct operation of the analyzer. Alternatively, an additional stage of differential pumping may be provided.

It will be further understood that as well as increasing the pressure in the expansion stage, advantage according to the invention can also be achieved by increasing the diameter of the skimmer orifice and/or reducing the separation between the sampling and skimmer orifices so that the skimmer orifice is located in a plane where the diameter of the barrel shock is smaller than it is in the conventional position. Both these approaches simply increase the ratio of skimmer orifice diameter to shock diameter and therefore reduce the ion distribution noise. However, increasing the orifice diameter tends to greatly increase the flow of gas into the second evacuated region and is therefore less preferred than simply increasing the pressure in the expansion stage to reduce the diameter of the barrel shock.

In further preferred methods and apparatus, the enhancement factor F is maintained greater than 1.5 and most preferably greater than 2.0 mB$^{1/2}$. This may be achieved by use of a skimmer orifice diameter of 1.0 mm, an expansion stage pressure of about 25 mB and a sampling member-skimming member separation of 2–3 mm.

A preferred embodiment of the invention given by way of example only will now be described in greater detail and by reference to the drawings, wherein.

Figure 1:
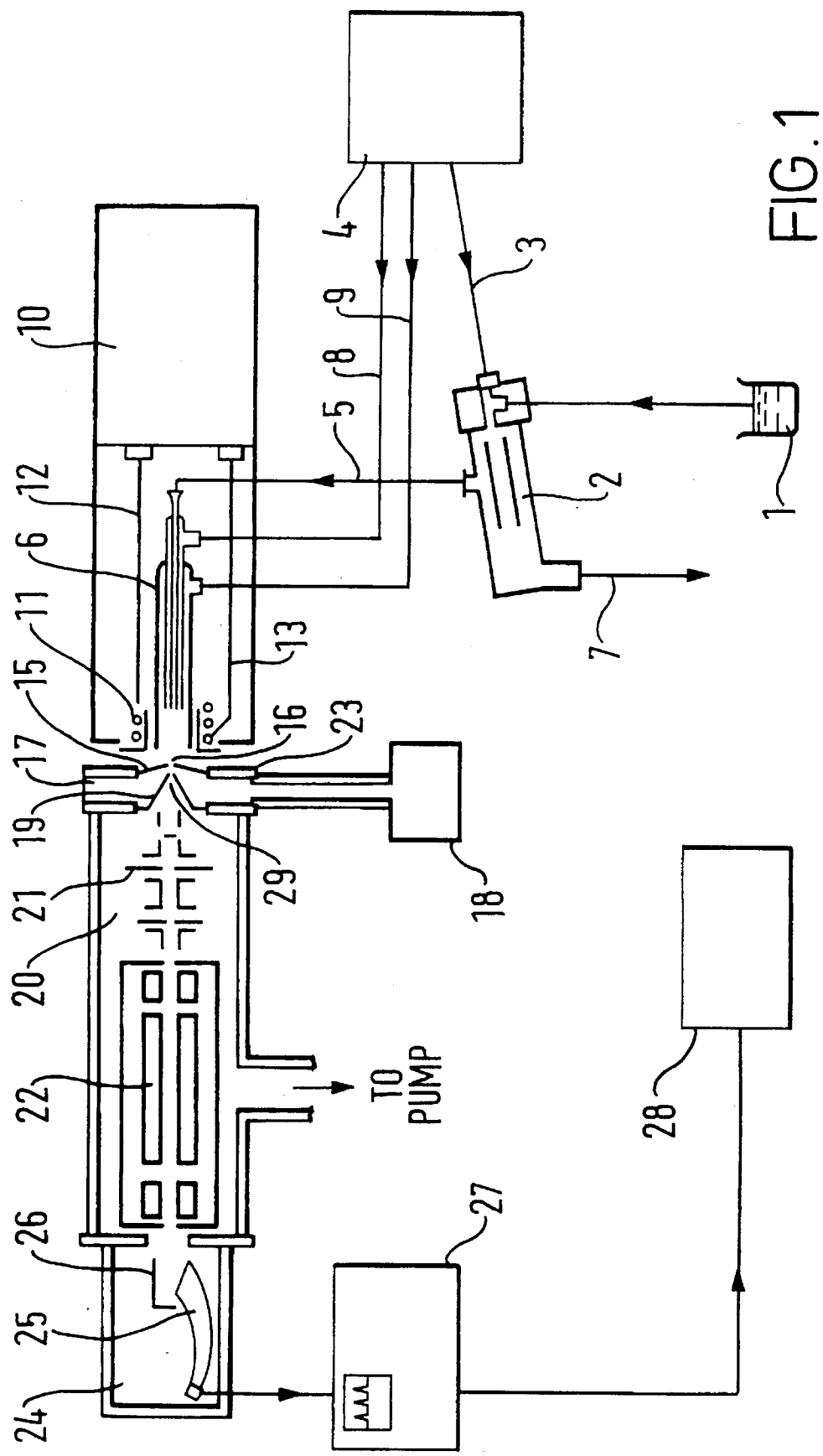
FIG. 1 is a schematic drawing of an ICPMS mass spectrometer.

Referring first to FIG. 1, a solution 1 of a sample to be analyzed is admitted to a nebulizer 2 which is fed by a flow of argon gas in pipe 3 from a gas supply unit 4. The sample, entrained in argon gas, is introduced into an ICP torch 6 through pipe 5, and excess solution is drained from the nebulizer 2 through a drain 7. The gas supply unit 4 provides two other controlled flows of argon to the torch 6 through pipes 8 and 9. A generator 10 supplies radio-frequency energy to a coil 11 via leads 12 and 13 so that a plasma 14 (FIG. 2) is formed at the end of the ICP torch 6.

The plasma 14 is directed against a sampling member 15 which is mounted on a cooled flange 23. A sampling orifice 16 formed in the member 15 communicates with an expansion region 17. A vacuum pump 18 maintains the expansion region at the desired pressure (see below). A skimmer member 19 comprising a skimming orifice 29 at its apex separates the expansion region 17 from a second evacuated region 20, evacuated by a turbomolecular pump (not shown) of sufficient capacity to maintain the pressure in region 20 lower than 10$^{-4}$ mB. An electrostatic lens assembly 21 is disposed in the region 20 to receive ions passing through the skimming orifice in member 19 and transmit them to a quadrupole mass analyzer 22. Ions which pass through the mass analyzer 22 enter an ion detector 24 where they are repelled by a deflector electrode 26 and enter an electron multiplier 25. The signal generated by the multiplier 25 is amplified by an amplifier in a display unit 27 which in turns feeds a digital computer 28 for processing the data from the detector 24.

Figure 2:
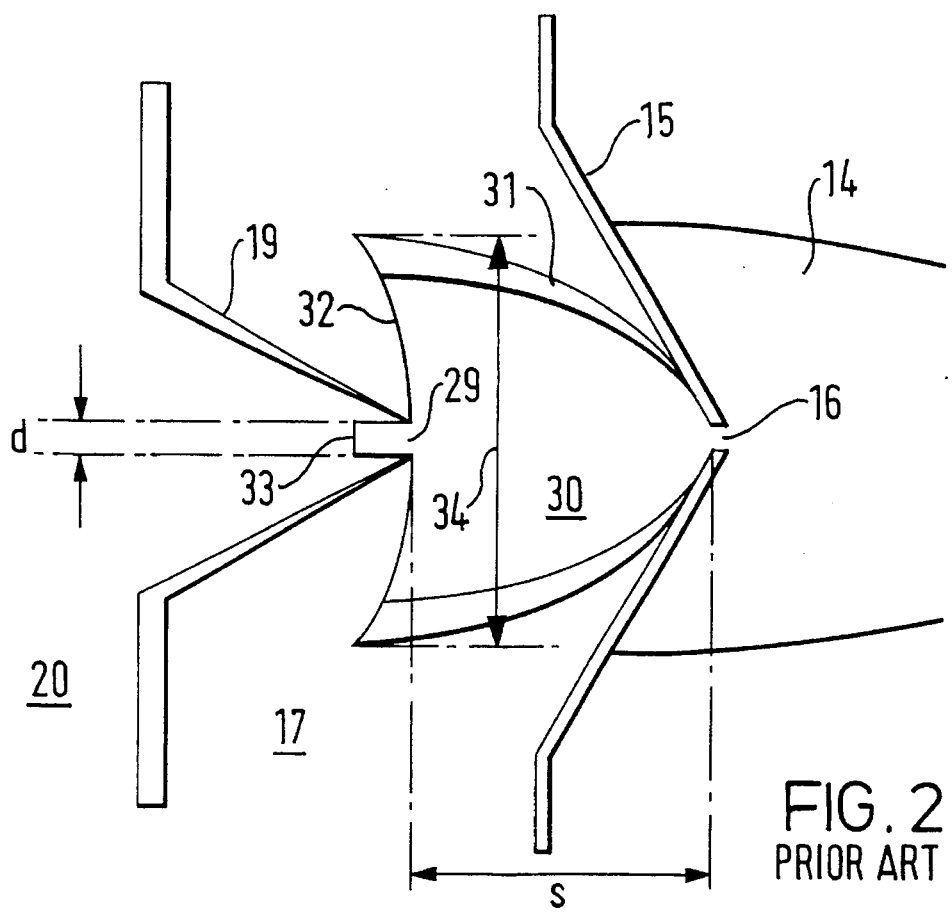
FIG. 2 is drawing of a typical prior type of nozzle-skimmer interface for the spectrometer of FIG. 1.

Referring next to FIG. 2, which illustrates the nozzle-skimmer interface region (comprising items 15, 16, 17 and 19) of a prior type of ICP spectrometer in more detail, a zone of silence 30 is formed in the expansion region 17 between the sampling member 15 and the skimming member 19. The zone of silence 30 is bounded by a barrel shock and a Mach disk, schematically shown at 31 and 32 respectively. Outside the boundaries of the zone of silence 30 the flow in region 17 is characteristically turbulent. As shown in FIG. 2 it is conventional for the orifice 29 in the apex of the skimming member 19 to be spaced at a distance s (FIG. 2) from the orifice 16 in the sampling member 15 such that s is smaller than the distance from the orifice 16 to the position that the Mach disk would occupy in the absence of the skimming member 19 (indicated by 33 in FIG. 2). This ensures that ions and molecules entering the expansion region 17 from the plasma 14 are sampled from the zone of silence 30, ensuring maximum efficiency. In a typical prior type of interface the diameter $d_s$ of the orifice 29 in the skimming member 19 may be approximately 1 mm and the spacing s between the orifices 16 and 29 may be about 7 mm. The pressure P in the expansion region 17 may typically be 2.5 mB which leads to an estimated maximum barrel shock diameter 34 of about 10 mm. These figures are chosen at least in part so that the capacity of the pump 18 used to evacuate the expansion region 17 is not impractically large when the diameter of the orifices 16 and 29 are about 0.5 mm and 1.0 mm respectively, and so that the pressure in the second evacuated region 20 can be maintained at less than $10^{-4}$ mB with reasonable capacity pumps. Table 1 shows the value of $d_s$ and $p_1$, for a number of prior types of interfaces of the type shown in FIG. 2.

TABLE 1

| Reference | $d_s$ (mm) | s (mm) | P1 (mB) | F (mB$^{1/2}$) |
|---|---|---|---|---|
| 1,2 | 0.9–1.4 | 6.0–11.8 | 1.3–1.65 | 0.60 |
| 3 | 1.0 | 6.0–10.0 | 1.3–16 | 0.65 |
| 4 | 1.4 | 6–24 | 2.0 | 0.32 |
| 5 | 0.88 | 6.1 | 4.1* | 0.28 |
| 6 | 1.0 | 10 | 1.3–4.0 | 0.20 |
| 7 | 1.31 | 11 | 3.13 | 0.21 |
| 8 | 0.88* | 6.1 | 6.65 | 0.37 |
| 9 | 0.55 | 2–5.5 | 6.65* | 0.70 |

Note:
Values marked * are estimated.

The publications from which the data presented in table 1 has been obtained are as follows:

1. Lam, Horlick, Spectrochim. Acta 1990 vol 45B (12) pp 1327–38
2. Vaughan, Horlick Spectrochim. Acta 1990 vol 45B (12) pp 1289–99
3. Chambers, Ross, Hieftje, Spectrochim. Acta 1991 vol 46B (6/7) pp 785–804
4. Olivares, Houk, Anal. Chem. 1985 vol 57 pp 2674–79
5. Douglas, Kerr, J. Anal. Atom. Spectrom. 1988 vol 3 pp 749–752
6. Ross, Hieftje, J. Am. Soc. Mass Spectrom 1992 vol 3 pp 128–38
7. Hu, Houk, J. Am. Soc. Mass Spectrom. 1993 vol 4 pp 733–741
8. Douglas, French. J. Anal. Atom. Spectrom. 1988 vol 13 pp 743–747
9. Sakata, Shitsurgo Bunskei, 1988 vol 36 (6) pp 245–61

Figure 3:
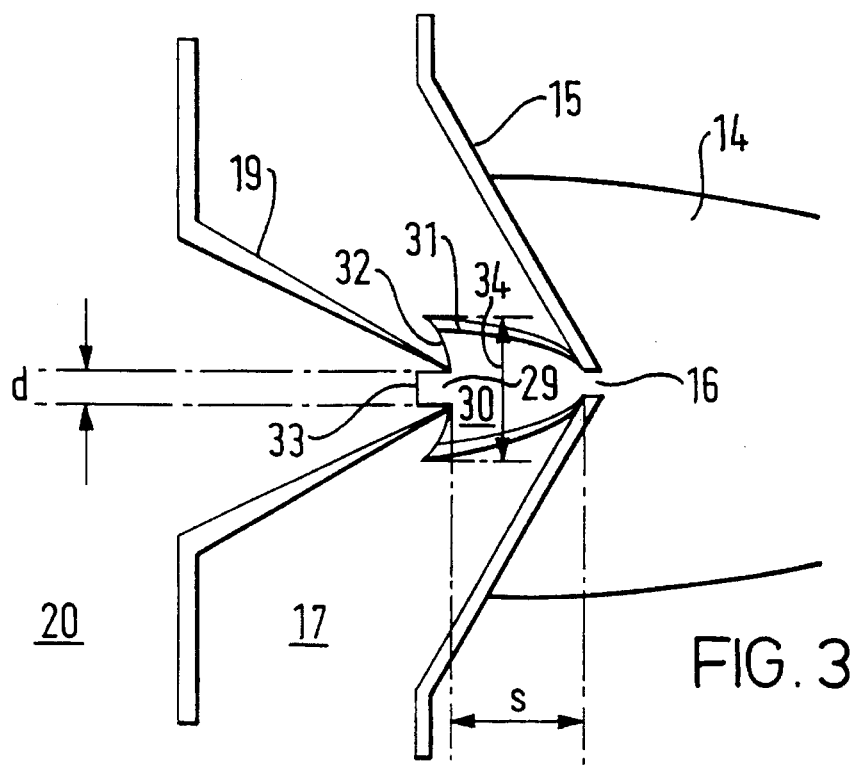
FIG. 3 is a drawing of a nozzle-skimmer interface according to the invention which is suitable for the spectrometer of FIG. 1.

Referring next to FIG. 3, in a spectrometer according to the invention the pressure in the expansion region is raised to 10–20 mB, or higher. This has the effect of reducing the diameter 34 of the barrel shock 31 and moving the position 33 of the Mach disk (in the absence of the skimming member 19) much closer to the orifice 16 in the sample member 15. Following the established theory, the skimming member 19 is therefore moved closer to the sampling member 15, so that s is typically 2–3 mm (compare the figures for s in Table 1). Thus typically the enhancement factor F is approximately 1.5 mB$^{1/2}$, which may be compared with the range 0.2 to 0.7 calculated for the prior systems listed in Table 1. It will be seen by comparing FIGS. 2 and 3 that for a given diameter $d_s$ of the orifice 29 in the skimming member 19 a much greater proportion of the flow in the zone of silence 30 will pass through the orifice 29 in the case of the FIG. 3 apparatus than is the case for the FIG. 2 apparatus.

The inventors have found that interfaces constructed according to FIG. 3 operating at higher than normal pressures (ie, with the enhancement factor F>0.80 mB$^{1/2}$, and preferably with F>1.5 mB$^{1/2}$), result in a greater precision of isotopic-ratio measurements, despite the fact that the transmission of the interface is typically lower than that of the prior types illustrated in FIG. 2. This may be attributed to the reduce effect of inhomogeneities in ion distribution along the central channel of the plasma 14, when a greater proportion of the zone of silence 30 is sampled through the orifice 29 in the skimming member 19.

A disadvantage of the apparatus and method according to the invention is that the increased pressure in the expansion stage 17 results in an increased flow of gas into the second evacuated region 20 where the mass analyzer 22 may be located. This may require the provision of larger capacity pumps to evacuate region 20 than would be necessary for the conventional interface of the type shown in FIG. 2. Alternatively, an additional stage of differential pumping may be provided between the expansion stage 17 and the second evacuated region 20.

Because of the increased gas load it is generally preferred to increase the pressure in the expansion stage 17, rather than the diameter of the orifice 29 in the skimming member 19, to gain the advantage of the invention, because increasing the diameter has a much greater effect on the flow of gas into the second evacuated region 20 than does increasing the pressure (for a given increase in the ratio of the skimmer orifice diameter $d_s$ to the barrel shock diameter 34).

What we claim is:

1. A method of isotopic analysis of a sample by mass spectrometry comprising the steps of:

a) introducing a said sample into the plasma generated by an inductively-coupled or microwave-induced plasma mass spectrometer;

b) sampling said plasma through an orifice in a sampling member into an evacuated expansion region so that a zone of silence bounded by a barrel shock and a Mach disk is formed downstream of the orifice in said sampling member;

c) allowing at least some ions from said zone of silence through an orifice in a skimming member into a second evacuated region maintained at a pressure lower than that in said expansion region;

said method characterized by: maintaining the ratio $$\frac{d_s}{s} \times \sqrt{p_1}$$

at a value greater than 0.8 mB$^{1/2}$, where $d_s$ is the diameter of the orifice in said skimming member (mm), s is the distance between the exit side of the orifice in said sampling member and the entrance side of the orifice in said skimming member (mm), and $p_1$ is the pressure (mB) at which said expansion region is maintained.

2. A method as claimed in claim 1 wherein the ratio $$\frac{d_s}{s} \times \sqrt{p_1}$$

is maintained at a value greater than 1.5 mB$^{1/2}$.

3. A method as claimed in claim 1 wherein the ratio $$\frac{d_s}{s} \times \sqrt{p_1}$$

is maintained at a value greater than 2.0 mB$^{1/2}$.

4. A method as claimed in claim 1 wherein the pressure $p_1$ is maintained between 10 and 30 mB.

5. A method s claimed in claim 2 wherein the pressure $p_1$ is maintained between 10 and 30 mB.

6. A method as claimed in claim 3 wherein the pressure $p_1$ is maintained between 10 and 30 mB.

7. A method as claimed in claim 1 wherein the pressure $p_1$ is maintained at a value such that the diameter of said barrel shock at the orifice of said skimming member is between 2 and 3 mm.

8. A method as claimed in claim 2 wherein the pressure $p_1$ is maintained at a value such that the diameter of said barrel shock at the orifice of said skimming member is between 2 and 3 mm.

9. A method as claimed in claim 3 wherein the pressure $p_1$ is maintained at a value such that the diameter of said barrel shock at the orifice of said skimming member is between 2 and 3 mm.

10. A method as claimed in claim 1 wherein said spacing $d_s$ is between 2 and 3 mm.

11. A method as claimed in claim 2 wherein said spacing $d_s$ is between 2 and 3 mm.

12. A method as claimed in claim 3 wherein said spacing $d_s$ is between 2 and 3 mm.

13. A mass spectrometer comprising:
   a) an inductively-coupled or microwave-induced plasma source;
   b) a sampling member disposed in contact with the plasma generated by said source and comprising an orifice;
   c) an expansion region into which material passing through the orifice in said sampling member may pass;
   d) means for maintaining the pressure in said expansion region at a value low enough to permit the formation of a zone of silence bounded by a barrel shock and a Mack disk, downstream of the orifice in said sampling member;
   e) a skimming member comprising an orifice disposed so that material may pass from said zone-of-silence into a second evacuated region;
   f) means for maintaining said second evacuated region at a pressure lower than that in said expansion region;
   g) a mass analyzer disposed downstream of said orifice in said skimming member for mass analyzing at least some of the ions passing into said second evacuated region through said skimming member;

said spectrometer characterized in that the ratio $$\frac{d_s}{s} \times \sqrt{p_1}$$

is maintained at a value greater than 0.8 mB$^{1/2}$, where $d_s$ is the diameter (mm) of the orifice in said skimming member, s is the distance between the exit side of the orifice in said sampling member and the entrance side of the orifice in said skimming member (mm), and $p_1$ is the pressure (mB) at which said expansion region is maintained.

14. A mass spectrometer as claimed in claim 13 wherein the ratio $$\frac{d_s}{s} \times \sqrt{p_1}$$

is greater than 1.5 mB ½.

15. A mass spectrometer as claimed in claim 13 wherein the ratio $$\frac{d_s}{s} \times \sqrt{p_1}$$

is greater than 2.0 mB ½.

16. A mass spectrometer as claimed in claim 13 wherein said means for maintaining the pressure $p_1$ maintains that pressure between 10 and 30 mB.

17. A mass spectrometer as claimed in claim 14 wherein said means for maintaining the pressure $p_1$ maintains that pressure between 10 and 30 mB.

18. A mass spectrometer as claimed in claim 15 wherein said means for maintaining the pressure $p_1$ maintains that pressure between 10 and 30 mB.

19. A mass spectrometer as claimed in claim 13 wherein said distance s is between 2 and 3 mm.

20. A mass spectrometer as claimed in claim 14 wherein said distance s is between 2 and 3 mm.

21. A mass spectrometer as claimed in claim 15 wherein said distance s is between 2 and 3 mm.

22. A mass spectrometer as claimed in claim 13 wherein said pressure $p_1$ is maintained at a value such that the diameter of said barrel shock at the orifice of said skimming member is between 2 and 3 mm.

23. A mass spectrometer as claimed in claim 14 wherein said pressure $p_1$ is maintained at a value such that the diameter of said barrel shock at the orifice of said skimming member is between 2 and 3 mm.

24. A mass spectrometer as claimed in claim 15 wherein said pressure $p_1$ is maintained at such a value that the diameter of said barrel shock at the orifice of said skimming member is between 2 and 3 mm.

* * * * *